US008011368B2

(12) United States Patent
Crutchfield

(10) Patent No.: US 8,011,368 B2

(45) Date of Patent: Sep. 6, 2011

(54) RESPIRATOR FIT-TESTING APPARATUS AND METHOD

(76) Inventor: Clifton D. Crutchfield, Tucson, AZ (US)

( * ) Notice: Subject to any disclaimer, the term of this patent is extended or adjusted under 35 U.S.C. 154(b) by 1029 days.

(21) Appl. No.: 10/599,953

(22) PCT Filed: Apr. 20, 2004

(86) PCT No.: PCT/US2004/012061

§ 371 (c)(1), (2), (4) Date: Oct. 13, 2006

(87) PCT Pub. No.: WO2005/113045

PCT Pub. Date: Dec. 1, 2005

(65) Prior Publication Data

US 2007/0295331 A1 Dec. 27, 2007

(51) Int. Cl.
*A62B 18/02* (2006.01)
*A62B 18/08* (2006.01)
*G01M 3/04* (2006.01)

(52) U.S. Cl. ......... 128/205.25; 128/206.21; 128/206.24; 73/40

(58) Field of Classification Search ............. 128/204.18, 128/204.21–204.23, 205.25, 206.21, 206.24, 128/206.28; 73/37, 40
See application file for complete search history.

(56) References Cited

U.S. PATENT DOCUMENTS 2,420,372 A 5/1947 Heidbrink
2,738,669 A 3/1956 Silverman et al.
3,486,366 A 12/1969 Jackson
3,948,589 A * 4/1976 DuBois ......................... 417/487
4,146,025 A 3/1979 Warncke et al.
4,674,492 A 6/1987 Niemeyer
4,765,325 A * 8/1988 Crutchfield .............. 128/202.13
4,846,166 A * 7/1989 Willeke .................... 128/200.24
4,905,683 A 3/1990 Cronjaeger
4,914,957 A 4/1990 Dougherty
5,289,819 A 3/1994 Kroger et al.
5,299,448 A 4/1994 Maryyanek et al.
5,647,356 A * 7/1997 Osendorf et al. ........ 128/206.17
5,803,076 A 9/1998 Myers
5,860,418 A 1/1999 Lundberg
6,425,395 B1 7/2002 Brewer et al.
2003/0100888 A1* 5/2003 Spinello ........................ 604/512
2003/0172925 A1* 9/2003 Zocca et al. ............. 128/202.22
* cited by examiner

*Primary Examiner* — Justine Yu
*Assistant Examiner* — Valerie L Skorupa
(74) *Attorney, Agent, or Firm* — Gavin J. Milczarek-Dessi; Quarles & Brady LLP

(57) ABSTRACT

Improved respirator fit-test methods and apparatus featuring an automated, respirator wearer-controlled, air-leak measurement system. For fit testing of a respirator positioned on a test subject's face and connected to a controlled negative pressure testing apparatus, the test subject simply holds his breath and then activates a switch in electrical connection with said apparatus, which results in the automatic closure of the breathing port on the respirator and the initiation of a complete fit-testing protocol. The fit-testing apparatus includes a single, self-contained, automated unit that includes a vacuum source (30), an air-flow measuring device, and an air-pressure transducer (32) for connection to a respirator (10) being tested. By measuring the rate of air exhausted from the respirator in order to maintain a constant challenge pressure, an air leakage rate is determined.

14 Claims, 2 Drawing Sheets

RESPIRATOR FIT-TESTING APPARATUS AND METHOD

BACKGROUND

1. Field of the Invention

The invention relates in general to respiratory face masks and more particularly to methods and apparatus that are especially useful for determining the degree of air-tight fit of a mask worn on the face of a user.

2. Description of the Related Art

Respirators, also known as face masks or gas masks, are used to protect personnel from breathing in contaminants while exposed to a contaminated environment. Respirators fall into two basic classes, the first class being a supplied air respirator in which a flexible hose connects a supply of clean air to the respirator, and the second class where the respirator draws air from a surrounding contaminated environment. The latter class is the most widely used of all respirators and respirators of this class generally are constructed to cover the wearer's nose and mouth with a flexible rubber mask which is held in place with an air tight relationship to the face as much as possible through the use of one or more elastic holding straps that encircle the wearer's head.

Respirators typically include a face piece (the part which covers the nose and mouth of the wearer) that may be constructed of rubber or silicone rubber. The face piece is held in place by means of the aforementioned rubber or elastic head bands which usually attach, by means of snaps, to the face piece and surrounds the head in one or more loops.

In the typical respirator of the second class, three apertures are formed in the face piece, two on opposite sides and one in the lower center area (see FIG. 1). The two apertures on opposite sides are designed to receive the inhalation filter cartridges which are the means by which contaminants are filtered from the environmental air and provide the path for air pulled into the face piece by the negative pressure created interiorly by the person inhaling. These inhalation filter cartridges, which appear to be extensions of the wearer's cheeks, are built-up devices having cartridge adaptors, inhalation valve flaps, filters of different types, perforated filter covers, gaskets, and the like. In addition, interchangeable cartridges are available that combine the filter and filter cover into a single cartridge which is screwed on to threads formed on the cartridge adaptor. The cartridge adaptor is in an air-sealed relationship to the face piece. In the lower center portion of the face piece is the exhalation valve, which opens during the time the wearer is exhaling, i.e., when there is an over-pressure interiorly to the face piece relative to the environment, and the exhalation valve closes when the wearer inhales, i.e., there is a negative pressure interiorly to the face piece relative to the environment. In addition, it is common also to place oppositely operating but similar type valves in the inhalation filter cartridges, i.e., upon an over-pressure interiorly to the face piece, the valve closes.

By interchanging different types of filter elements, a respirator may be specifically designed for a particular environment. For example, activated charcoal acts as a scrubber for gases whereas felt, cloth, or paper may be utilized in a paint aerosol environment.

As can well be imagined, of primary concern is the fit of the respirator against the face of the wearer insomuch as, if there is not an air tight fit, the environment will be drawn into the face mask upon inhalation, thus at least partially defeating the purpose of the respirator. Various tests and methods have been devised to determine a "fit factor" for a respirator as applied to a certain person, and the way the test is designed, the higher the number the better the fit. Thus, as defined in the art, the fit factor is a ratio of the contamination level outside the mask divided by the contamination level inside the mask; or alternatively the ratio of total (purified+contaminated) air inspired divided by contaminated air inspired. For example, if a person breathes in air at a rate of 35 liters/minute and it has been determined that 350 milliliters/minute did not enter through the purifying inhalation filter cartridges, the fit factor is a ratio of 35 l./minute ÷0.35 l./minute=100.

The most common method used today of determining the fit factor for respirators is to place a person in an environment with a known concentration of contamination, collect air from the mask interior, and then determine the concentration of the contaminant in such collected air. Air borne contaminants which are commonly used in tests of these types include: di-octal phthalate, commonly called DOP, corn oil, sodium chloride salt fogs, and ambient aerosols. The techniques by which monodispersed contaminant particles are precisely generated and uniformly dispersed in air for these tests are generally rather complicated.

Another major problem in evaluating respirators through today's methods is how the concentration of the air borne contaminant, more commonly called aerosols, is measured. One of the most popular methods used today is to measure concentration through light scattering techniques, i.e., shining a light through a known volume of the captured contaminants and then determining concentration through photometric cell measurement of scattered light.

However, this method has problems in many cases. First, the measuring equipment usually lies some distance away from the party under test (usually outside a sealed chamber) and hoses used to convey the breathed air with contaminants may be porous or partially porous to the particular contaminant or may adsorb the contaminant. Second, as may well be imagined, since wearers' faces are differently shaped and sized, one respirator is not going to fit all people. Accordingly, companies manufacture different sizes. Nevertheless, from the very fact that there are different sizes available in most respirators, attempts to fit the respirator to one particular person mean that there is still a compromise. In addition, the rate of contaminant leakage changes as the wearer breathes at different rates and volumes due to the strenuousness of the wearer's activity. Thus, the fit factor determined for a wearer in a resting condition may not adequately describe the fit factor achieved with the same respirator under more vigorous work conditions.

Consequently, missing from the field of respirator fit data is how well respirators fit a person and what degree of protection is afforded a wearer who wears the mask over a long period of time and under varying conditions of work.

During inhalation, or, as more commonly called in the field, "inspiration", the inspiratory volume and the inspiratory flow rate, i.e., the rate of movement of air into the wearer's lungs, causes a negative pressure difference between the environment outside the mask and the interior of the face mask. Increasing inspiratory volume and increasing inspiratory flow rate causes a greater negative pressure to be induced inside the mask during more rigorous work conditions. The varying of negative pressure interiorly to a mask simulates varying conditions of work of the wearer, and thus provides a method for determination of fit factor under the varying conditions.

In addition, because of the time, expense, and difficulty in determining a fit factor for a particular respirator, many workers who wear respirators day in and day out are never checked to see which respirator, of all available respirators, achieves for them the highest, and thus the safest, fit factor in order that maximum protection may be afforded.

One approach to the problems encountered with respirator-fit testing is disclosed in U.S. Pat. No. 4,765,325. This patent discloses a system and a method for determining face respirator fit by measurement of leakage air into the interior of the respirator. The method generally included the steps of sealing the respirator against the inhalation and exhalation of air; placing the respirator on the face of the user; having the user inhale air and hold his breath; achieving a desired vacuum within the respirator by evacuating air therefrom; monitoring the pressure interiorly to the respirator; withdrawing air from the respirator to maintain constant the desired vacuum; and measuring the air withdrawn from the respirator, whereby knowing the air withdrawn to maintain the constant partial vacuum air pressure, the leakage air is known and the fit of the respirator determined.

While the invention above advanced the state of the art, experience has shown that the improper sequencing of the test steps, or failure of the subject to comply with test requirements, can have adverse effects on test quality and results. For example, if a test subject prematurely closes the breath inhalation valve of the mask before completing the "preparatory" inhalation that precedes the "holding breath step," a substantial amount of negative pressure can be trapped inside the respirator, thereby disrupting the remaining test steps. Experience has also shown that the existing test apparatus is very sensitive to any volumetric and pressure changes associated with the test subject's head or facial movement. Often such movement will require that a test be repeated. Finally, previous test protocols involve at least two persons—the test subject and the test administrator. Sometimes a test subject becomes "fidgety" or even fearful during a test because someone else is controlling the progression of the test (and hence the amount of time that the respirator is sealed and the wearer's breath must be held). Such problems have led some evaluators of the prior controlled negative pressure testing method to doubt the veracity and/or general usability of controlled negative pressure fit testing.

Accordingly, it is apparent that there exists a need for new and improved methods and apparatus by which the fit factor for any one mask upon an individual's face may be determined while, preferably, the test subject has control over the test and can perform the testing method under conditions which he or she may expect to encounter during the work day.

SUMMARY OF THE INVENTION

The invention relates in general to apparatus and methods for fit testing respirators. More particularly, the invention features improved respirator fit-testing methods and apparatus that includes a single automated, respirator wearer-controlled air-leak measurement unit (i.e., a leak rate analyzer). The invention also relates to respirator fit-testing methods and apparatus that simplify test procedures, improve accuracy of test results, minimize test subject apprehension during testing, and provide a better assessment of respirator integrity for a given individual wearer.

Since, as previously discussed, contaminants are drawn into the respirator through leakage paths between the face of the wearer and the respirator during the periods of inspiration, i.e., inhalation when a negative pressure is created within the respirator, and since, during times when a wearer is actively working and demanding more breath, a greater negative pressure is created, pressure monitoring of various negative pressures interiorly to the respirator and measurement of the rate at which air is removed in order to sustain the negative pressure can be a means of determining the best fit under all conditions.

The interior parts of the two inhalation filter cartridges which attach to the face piece are removed, as well as the perforated filter cover, and non-perforated filter covers are screwed on to the cartridge adaptor attached to the face piece. Through these filter covers are placed cylindrical ports which communicate with the face piece interior and to which are attached rubber or plastic tubing.

In the preferred embodiment, three ports penetrate the total of the non-perforated inhalation filter covers for connection to the apparatus of the invention. For convenience, two ports may be situated in one filter cover and one in the other. First, to one port located through an inhalation filter cover, a quick close air valve is attached, thereby forming a breathing port. Then, to another port penetrating one of the inhalation filter covers is attached a pressure monitor transducer of the type that emits an electrical control signal linearly indicative of the sensed air pressure difference from a pre-set desired air pressure. Through the other port in the inhalation filter cover is connected flexible tubing, which in turn connects to the inlet of a mass flow meter. To the outlet of the mass flow meter is also connected a source of vacuum pressure. This source of vacuum pressure comprises a piston with an electrically controlled air valve interposed in the flexible tubing between the mass flow meter and the piston. The electrically controlled air valve is connected to the electrical output of the pressure monitoring transducer.

In operation, the face piece is first fitted on the wearer with the fitting straps all attached to make the mask as air tight as possible, yet be comfortable. The flexible tubing is connected to the ports in the inhalation filter covers as noted above. The party breathes through the breathing port prior to the commencement of the test. To initiate a test, the subject party is instructed to inhale and to hold his breath. Then, the subject actuates a switch controlling the air valve at the end of the breathing port. The breathing port is then closed off, sealing the mask from all entrance of outside air other than through any leakage paths that may exist or develop. Then the apparatus is set in operation which includes starting the vacuum source.

The pressure transducer senses that the pressure interiorly to the face piece is not the negative pressure value pre-selected and a signal is sent to the electrically controlled air valve interposed between the face piece and the vacuum source. The air valve opens and the vacuum source pulls air through the mass flow meter and the electrically controlled air valve. As the negative pressure interiorly to the face piece approaches the pre-selected level to which the pressure monitor transducer is set, the proportional signal generated by the pressure monitor transducer is reduced, which in turn reduces the size of the orifice in the electrically controlled air valve until the steady-state pre-selected negative pressure has been established in the respirator interior. A period of 3 to 5 seconds is permitted to allow the negative pressure to reach a steady state equilibrium throughout the interior of the face piece, the equipment, and the tubing.

The ideal situation would be that very little air leaks interiorly to the face piece and thus the electrical voltage output of the pressure monitor transducer would be zero with perhaps a small output from time to time indicating that there was some small amount of leakage, and, as the pressure interiorly to the mask rose, the pressure monitor transducer would detect it. Correspondingly, the electrically controlled air valve would be closed the majority of the time and then opened as it received an electrical signal from the pressure monitor transducer to thereby permit the vacuum pump to regain the negative pressure desired. Thus the system would be indicative of the average of leakage air over an extended period of time.

However, in reality, tests indicate that there is a constant leakage of environmental air into the face piece such that the pressure monitor transducer is constantly outputting a signal and, correspondingly, the electrically controlled air valve is never completely closed off and air is constantly being pulled through the mass flow meter.

Accordingly, the electrical signal from the pressure monitor transducer continues to control the opening of the electrically controlled air valve so that the negative pressure in the face piece is maintained at its pre-selected level. Selection of this pressure is made to replicate the negative pressure normally generated in the mask during inspiration through the air purifying cartridges which duplicates the negative pressure driving force for air leakage into the mask.

The flow rate of air removed from the face piece through the mass flow meter by the vacuum system which was required to maintain the pre-selected negative pressure is equal to the leakage flow rate of air into the respirator. Thus, measurement of the flow rate of the removed air utilizing the mass flow meter gives an absolute determination of leakage around the face piece for the particular negative pressure induced interiorly to the face piece. Obviously, the negative pressure interiorly to the face piece can be increased (made more negative) thereby simulating a wearer working hard and thus demanding more air. Under such varying conditions, the leakage air flow can be determined and the fit factor over the expected simulated conditions determined for one wearer with different respirators. Thus, the best respirator for any particular person may be easily determined.

In accordance with various objects of the invention, new and improved respirator fit-testing methods and apparatus are provided.

Various other purposes and advantages of the invention will become clear from its description in the specification that follows. Therefore, to the accomplishment of the objectives described above, this invention includes the features hereinafter fully described in the detailed description of the preferred embodiments, and particularly pointed out in the claims. However, such description discloses only some of the various ways in which the invention may be practiced.

BRIEF DESCRIPTION OF THE DRAWINGS

In various views, like index numbers refer to like elements.

DETAILED DESCRIPTION OF THE PREFERRED EMBODIMENTS

The invention relates to improved respirator fit-testing methods and apparatus that include a single automated, respirator wearer-controlled air-leak measurement unit. More particularly, the invention relates to respirator fit-testing methods and apparatus that simplifies test procedures, improve accuracy of test results, minimize test subject apprehension during testing, and provide a better assessment of respirator integrity for a given individual wearer.

Figure 1:
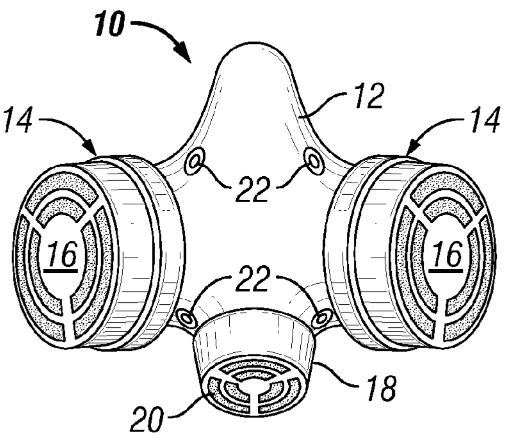
FIG. 1 (Prior Art)
FIG. 1 is a front view of a typical respirator.

Referring now to FIG. 1, a front view of a prior art respirator or mask 10 for wearing by a party and which covers the party's nose and mouth is illustrated. Firstly, the face piece 12 is constructed of soft pliable rubber or silicone adapted to insure, as far as possible, an air tight seal between itself and the wearer's face. In many respirators, there is an oversized lip around the edge which resides next to the face to insure the best fit possible. Other respirators or masks not illustrated may be expanded in size and scope to cover the full face, including the eyes. On both sides of the face piece 12 are the inhalation filter cartridges 14 through which the environmental air passes and is filtered for breathing by the wearer. These inhalation filter cartridges 14 comprise various parts consisting of a perforated filter cover 16 which is generally cup-shaped, much like the lid on a jar, and has female threads around its rim adapted to engage male threads on the base cartridge adaptor. The interior of inhalation filter cartridge 14 is packed with various types of filters such as cloth, felt, activated charcoal filled pads and the like. In addition, a butterfly-type popper valve may be situated interiorly to the cartridge adaptor which opens upon inhalation (when negative pressure relative to the environment air pressure is generated) and closes upon exhalation (when over pressure relative to the environment air pressure is generated). Lastly, the inhalation filter cartridge 14 mates with the face piece 12 by its cartridge adaptor engaging in an air-tight sealed manner with an opening in the face piece 12.

At the lower center portion of the face piece 12 is the exhalation valve 18, which is simply a butterfly-type popper valve flap adapted to open during times of over-pressure interiorly to the face piece, i.e., exhalation by the wearer, and to close during periods of negative pressure interiorly to the face piece, i.e., during inhalation. The exhalation valve similarly is capped with a perforated exhalation valve cover 20 which, like the inhalation filter cover, is cup-shaped, much like a jar lid, and snaps on to the exhalation valve seat. Also, like the inhalation filter cartridge, the exhalation valve 18 mates with an opening through the face piece 12 in an air-tight type arrangement.

Lastly, shown on the respirator 10 are the snaps 22 by which the straps (not shown) attach to wrap around the wearer's head in order to hold the face piece 12 against the wearer's head.

Figure 2:
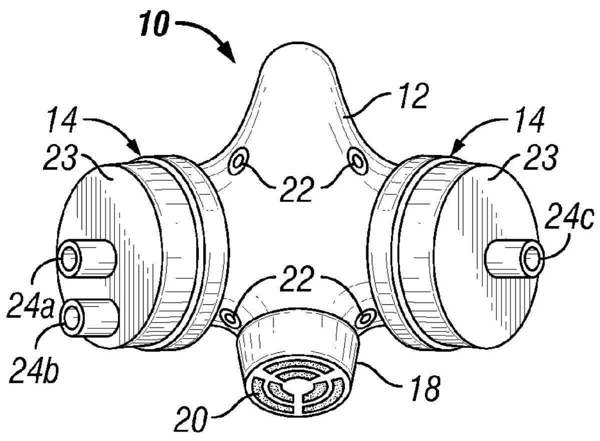
FIG. 2 is a front view of a respirator modified for use in the subject invention.

FIG. 2 illustrates the subject respirator 10 with modifications wherein the inhalation filter cartridges 14 of FIG. 1 have had all their interior parts removed, i.e., filter medium and valve flaps, together with perforated filter covers 16, removed and replaced with air-tight, non-perforated inhalation filter covers 23 where short cylindrical ports 24A, 24B, and 24C have been attached by soldering or other mechanical air-tight connection methods. This provides an unobstructed air path through the ports into the now hollow inhalation filter cartridge 14 to the interior of face piece 12. It is noted that ports may be located on either or both of the non-perforated inhalation filter covers 23, all providing air access from the environment to the interior of face piece 12. The exhalation port 18 remains intact and unchanged.

While it has been noted that the inhalation filter covers have been utilized to receive the air ports 24A through 24C, and that, of the three ports needed, two have been placed on one inhalation filter cover, any arrangement could be utilized for placement of these three ports among the two covers. The sole purpose is to permit, through the ports, unobstructed air access into the interior of the face piece without modifying the configuration of the face piece fit.

By modifying the respirator 10 as shown in FIG. 1 to the configuration shown in FIG. 2, the test to determine the fit factor of any mask on any wearer may proceed, together, of course, with the equipment that will be detailed below.

Figure 3:
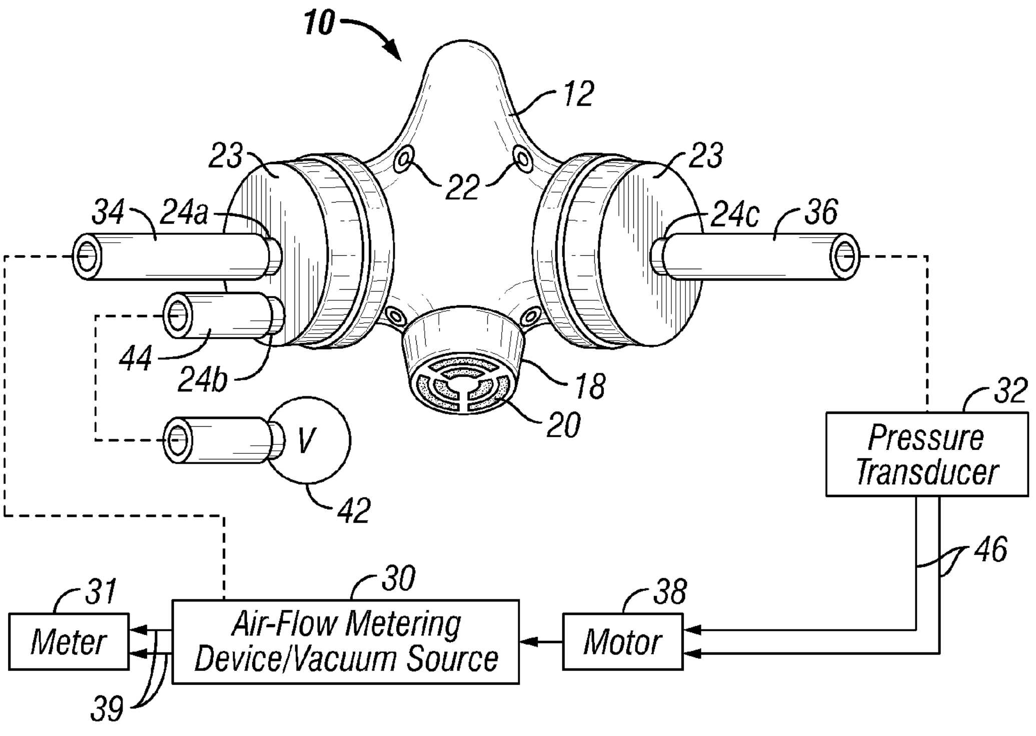
FIG. 3 is a block schematic diagram of a preferred embodiment of the invention.

Referring now to FIG. 3, a schematic block diagram of the respirator and the preferred testing apparatus of the invention is shown. Firstly, respirator 10, and more particularly face piece 12, is operably attached via the modified inhalation filter covers 23 and their respective cylindrical ports 24A-24C to the combination air-flow metering device and vacuum source 30 and the pressure transducer 32 by flexible tubing 34 and 36, respectively. Electrical connections 46 connecting pressure transducer 32 to the combination air-flow metering device and vacuum source 30 are also shown. Next, operably attached to port 24B on inhalation filter cover 23 is air pressure source 42 (e.g., a "squeeze bulb"), the connection being made through flexible tubing 44. A diaphragm-type valve (not shown) is disposed in filter port 24*b* such that, when the valve is open, a breathing port is created. Conversely, when the air pressure source 42 is activated, the diaphragm closes such that the breathing port is sealed air-tight. Lastly, meter 31 records the analog voltage output of air flow measuring device 30. Preferably, all of the elements described in FIG. 3 are contained in a single piece of equipment.

The function of each of the blocks shown in the schematic block diagram of FIG. 3 is as follows. The combination air-flow measuring device and vacuum source 30 comprises a means by which the passage of air is measured and recorded either by volume or by mass. In the preferred embodiment, a piston precisely controlled by a stepper motor 38 and capable of measuring the volume of air exhausted from the face piece 12 over a period of time is utilized. The precisely controlled piston also acts as the vacuum source 30, which pulls, by means of a partial vacuum, the air from the interior of face piece 12 through the tubing 34 connecting the piston to the interior of face piece 12.

As air leaks past the wearer's face and face piece 12 into the interior of the respirator 10, the combination air-flow measuring device and vacuum source 30, being operated by motor 38 to maintain a constant negative pressure interiorly to face piece 12, will exhaust an equal volume of air as leaks into the respirator. The amount of piston displacement required to exhaust air from face piece 12 in order to maintain the pre-selected negative pressure inside face piece 12 is used to define the volume of air exhausted from the face piece. By this means, measuring the volume of air exhausted from face piece 12 by the precisely controlled piston 30 during the test period is a measurement of the air leakage into the respirator from the environment. Measurements are thus conveyed via electrical lead lines 39 and recorded on voltage meter 31 and may be converted for display on an LED screen and the like (not shown).

The only part remaining to be described is the means by which the negative pressure interiorly to face piece 12 is sensed in order to maintain a constant fixed negative pressure. This is accomplished by means of a pressure monitor transducer 32 connected by flexible tubing through port 24C to face piece 12. The electrical signal output of the pressure transducer 32 is indicative of a change in air pressure from a preset amount and is sent to the motor 38 that controls the combination air-flow measuring device and vacuum source 30 by means of electrical lead lines 46. In this manner, the piston can be controlled so that a vacuum is applied to the system to initiate the start of the test by establishing the desired negative pressure interiorly to the face piece and connective tubing and instruments, and during the test to maintain the negative air pressure interiorly to the face piece and connective tubing and instruments at the pre-selected value. As pressure monitor transducer 32 senses that the pressure interiorly to the face piece 12 is approaching the pre-selected level, it responds by reducing the voltage of the signal on the electrical lead lines 46 and thereby adjusts the combination air-flow measuring device and vacuum source 30 to establish the pre-selected negative pressure in the mask interior. The air pressure monitor transducer 32 continues to seek the negative pressure desired and thereby maintains the pre-selected negative pressure as closely as possible. The air-flow rate to the vacuum source required to maintain the pre-selected negative pressure is measured by the combination air-flow measuring device and vacuum source 30 as described above. It is most likely that, throughout the test, the vacuum source will constantly be pulling a small amount of air from the face piece.

When the test commences, the subject is instructed to inhale, to close his mouth, and to hold his breath. Then air pressure source 42 is activated and the valve within port 24B closes. If the subject is unable to positively close off his nose to air flow from the respiratory system while holding his breath, a nose clamp may be worn prior to and during the test. Then, the combination air-flow measuring device and vacuum source 30 is utilized to create a chosen negative pressure (negative with respect to the environment, but still an absolute pressure value) interiorly to face piece 12 until the pressure transducer 32 indicates that the desired pressure is reached. This will typically take a few seconds. After the air pressure has been set and stabilized interiorly to the face piece 12, the volumetric flow rate of air which leaks into the respirator is measured by precisely controlled piston displacement (i.e., the combination air-flow measuring device and vacuum source 30) over a set period of time by the testing operator monitoring its output. It may be expedient to insert air chambers and/or dampers in the flexible tubing between different pieces of the apparatus of the invention to rapidly reach the steady state pressure and/or to provide a smooth, non-pulsed vacuum source.

As mentioned above, a micro-processor controlled stepper motor 38 (Elwood Gettys Model 23A, Racine Wis.) preferably is used to precisely control the combination air-flow measuring device and vacuum source 30 used to both generate and measure the rate of air exhaust from the facepiece shown in FIG. 3. Similarly, a Honeywell Model 160PC amplified voltage output type pressure transducer is utilized as the pressure transducer 32. Both the combination air-flow measuring device and vacuum source 30 and the pressure transducer 32 output their respective readings by electrical lead lines 46 and 39 as shown in FIG. 3. These readings are monitored by the operator administering the fit-factor test wherein the analog electrical voltage output read on meter 31 is indicative of the volume of the air displaced over the period of the test. If the operator knows the volume of air, pressure, and temperature, the mass can be calculated if desired.

Figure 4:
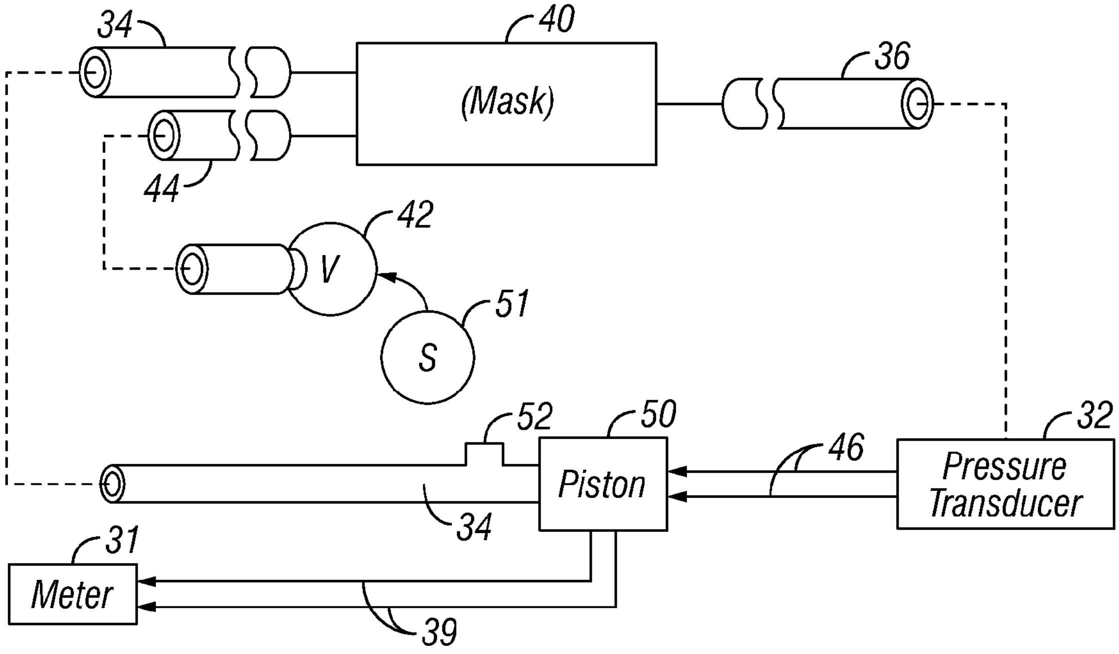
FIG. 4 is a block schematic diagram of a second embodiment of the invention.

The combination air-flow measuring device and vacuum source 30 may take any one of a number of forms. In the preferred embodiment of the invention discussed above, the combination air-flow measuring device and vacuum source includes a piston 50 (FIG. 4). Since the piston 50 provides a continuous vacuum, by-pass orifice 52 is provided connected to tubing 34 in order that some air would be pulled into the vacuum source at all times. Determination of the air flow rate through the by-pass orifice 52 at any pre-selected negative test pressure is accomplished by inserting a length of airtight calibration tubing (not shown) to connect the mask air withdrawal tubing 34 to the pressure transducer tubing 36, thereby temporarily replacing the respirator 40 with an air tight connection so that the by-pass orifice becomes the only source of leakage into the calibration test tubing. Calibration consists of determining the air pressure drop across the by-pass orifice 52 during operation of the piston 50 at various known air flow rates. The developed relationship between by-pass orifice pressure drop and air flow rate is then stored and used to subtract out by-pass orifice flow rates at the pre-selected mask test pressure during actual mask testing.

Empirical data that is widely available indicates accepted values for inspiration flow rates for various sized persons performing activities while wearing a respirator, such activities comprising sitting, walking, and various types of labor. Similarly, the negative pressure interiorly to the face piece for these different inspiratory flow rates is also known through empirically obtained data. Thus, the negative pressure in the face piece can be adjusted to these known negative pressures, and the leakage flow rate, as determined by the air-flow measuring device, related to the empirical data and then the ratio of the inspiratory flow rate over the leakage flow rate determines the fit factor for a particular respirator applied to a particular person and for a pre-selected negative pressure.

It is apparent from the above discussion that determining the fit factor for any one party with a particular respirator can be done in just a few seconds, not more than ten or fifteen seconds, for each pre-selected negative pressure desired to be present interiorly to the face piece. Further, it is not necessary for the party to be placed in a contaminated environment. Consequently, in just a matter of moments, the best fitting respirator for any particular person can be determined for the range of activities the party is expected to be doing in a contaminated environment.

It is also apparent from the above discussion that the method and apparatus embodied in this specification may also be applied to respirators that have no separate inhalation and exhalation cartridges and/or ports, or where a single air line leads to the respirator face piece since in accordance with the method described, all inhalation and exhalation cartridges and/or ports are air-sealed and at least one air-port added in order to provide communication between the interior of the respirator face piece and the equipment utilized in the method to determine the respirator fit factor.

Preferred Fit Testing Methods

As discussed in Crutchfield et al. (Applied Occupational and Environmental Hygiene, Vol. 14 (12):827-837, 1999, the contents of which are incorporated herein by reference), several quantitative respirator fit-test protocols exist.

One preferred testing method for Controlled Negative Pressure (CNP) respirator fit testing involves the following basic steps:

1. Temporarily sealing the respirator or mask face piece in an airtight manner by replacing the normal filter(s) with airtight manifold(s) that include a subject-operable (manual or electronically controlled, e.g., switch 51 in FIG. 4) airtight breathing valve;
2. having the test subject close the airtight breathing valve and then hold his/her breath with a closed mouth for approximately 10 sec;
3. exhausting air from the temporarily sealed respirator in order to establish a negative in-mask challenge pressure that is equivalent to the mean in-mask inspiratory pressure associated with normal respirator use;
4. controlling the air exhaust rate in order to maintain a constant in-mask challenge pressure; and
5. measuring the rate of air exhaust required to maintain the constant challenge pressure. With the challenge pressure held constant, air in equals air out, which means that the air exhaust rate is directly equivalent to the air leakage rate into the respirator.

One variation of the protocol above utilizes the OHD Fit-Tester 3000® CNP Fit Test System (OHD Inc., Birmingham, Ala.) to implement the CNP fit test method as follows:

1. Use of a rubber squeeze bulb to allow the test subject to close and control a rubber diaphragm in the airtight breathing valve described above;
2. use of a microprocessor controlled, stepper motor-driven piston as a vacuum source and air-flow measuring device to establish and maintain the in-mask challenge pressure; and
3. measurement of physical piston displacement/time while the challenge pressure is held constant, which yields an actual air-exhaust rate and measured respirator-leak rate. Thus, a typical test protocol would include the steps of:
   1. The test subject takes a breath and holds it;
   2. the subject then seals the breathing port in the test adapter by squeezing a rubber bulb to force a rubber diaphragm into the circular breathing port;
   3. the test administrator initiates the fit test by pushing a key on the CNP device;
   4. the CNP device then exhausts air from the temporarily sealed respirator to generate and maintain the desired negative challenge pressure inside the respirator for the specified test period (usually about 8 sec); and
   5. with challenge pressure held constant, measurement of the piston displacement rate yields a direct measure of the air leakage rate into the respirator.

Test subject comfort and test quality dictate that, once the test subject holds her breath, the remainder of the test protocol should be optimized so that the majority of the subject's breath-holding time can be devoted to test measurements. However, experience has shown that either improper sequencing of the test steps, or failure of the test subject to maintain sufficient pressure on the squeeze bulb, can adversely affect test quality and result.

For example, if the test subject prematurely squeezes the bulb before fully completing the "preparatory" inhalation immediately preceding the breath hold, a substantial amount of negative pressure can be trapped inside the respirator, thereby disrupting the initiation and successful completion of air flow measurements. Failure to maintain sufficient pressure on the squeeze bulb throughout the test period can create a possible air leakage path though the breathing port that could be misinterpreted by the CNP device as respirator leakage.

These potential problems can be minimized by automating the CNP fit test initiation phase using the following procedures:

1. Replace the test subject-operated squeeze bulb with a electrical test initiation switch that is normally open. Subject activation of the switch during any part of the "preparatory" inhalation initiates the following test sequence:
   a. CNP device monitoring of internal mask pressure to ensure that post-inhalation in-mask pressure returns to ambient pressure before the breathing port is closed;
   b. with ambient pressure re-established inside the test mask, an internal mechanical piston of sufficient size and stroke to generate the air pressure needed to close the breathing port diaphragm is activated;
   c. with the breathing port closed and internal mask pressure equilibrated to ambient pressure, the CNP device then exhausts air from the temporarily sealed respirator to generate and maintain the desired negative challenge pressure inside the respirator for the specified test period.

The electrical initiation switch provides test subjects with positive control of their access to breathing air if needed during a test. Release of the switch by the subject results in opening the breathing port. This will normally occur immediately after completion of the specified test period (currently 8 sec). For safety reasons, the initiation switch may include a spring-loaded button or equivalent feature (e.g., "dead-man" type switch) to ensure that the breathing port is opened should the test subject become impaired (e.g., lose consciousness), especially when alone.

Improving the Controlling Algorithm for the CNP Fit Test Device

The controlling algorithm for the microprocessor-controlled stepper motor used to both generate and maintain CNP challenge pressure and to measure the test respirator air leak rate was written to accomplish three primary objectives:

1. Establish the selected CNP challenge pressure inside the test respirator. This objective is hereinafter referred to as the "attack" phase of the test.
2. Maintain the challenge pressure during the fit test. This objective is referred to as the "track" phase of the test (the combined duration of the attack and track phases is currently 8 seconds).
3. Derive and report a measurement of leakage flow rate. The "measurement" phase of the test occurs during the track phase.

These three objectives are discussed in turn below.

Attack Phase—Establishing the Challenge Pressure

During the attack phase, the control algorithm starts the initial piston pull on an initial attack slope and then uses feedback about internal mask pressure to control the rate of piston pull and subsequent air exhaust from the mask. The primary challenges associated with establishing the challenge pressure are related to: a) time conservation (i.e., the need to establish challenge pressure as quickly as possible in order to maximize available mask leak measurement time); b) internal mask volume (i.e., because full-face respirators have substantially more volume than half-mask models, the former requires a greater exhaust volume in order to establish the challenge pressure); c) compliance and/or rebound of the mask material (e.g., compliance of silicone vs. hard rubber); and d) air leakage rate into the test respirator through facial sealing surfaces.

The task of quickly establishing challenge pressure given the variable internal volumes, compliances, and leak rates associated with the wide range of currently available respirator models, sizes, and materials has proven difficult to resolve with a single initial attack setting in the controlling algorithm.

In fact, the current FitTester 3000® algorithm is designed to establish challenge pressure inside the temporarily sealed respirator within 3 seconds. In general, that goal is met. However, the aggressive nature of the current initial attack setting can result in substantial initial overshoot of the challenge pressure in well-fitting (low leakage) respirators. This challenge pressure overshoot adversely affects overall CNP test quality in two ways. First, the amount of make-up air required to relieve the excessive in-mask vacuum (negative pressure) associated with a challenge pressure overshoot is a direct function of the magnitude of the pressure overshoot and internal mask volume. Makeup air must come either through a respirator leakage path or through the by-pass orifice currently incorporated in the system to enable a minimum rate of piston travel and exhaust flow under very low mask leakage conditions. Thus, a substantial amount of test time can be lost while waiting for overshoot pressure regain in a large volume mask with a low leak rate. For example, full-face respirators and gas masks that have large internal volumes can require 5 seconds or more to establish an acceptable (i.e. measurable) steady track of challenge pressure following an overshoot. This significantly limits the time available for measuring respirator leakage during the total 8-second test period.

A second adverse effect related to challenge pressure overshoot occurs because pressure regain occurs much more rapidly in smaller volume masks (i.e. half-mask respirators). In such cases, in-mask pressure returns to the pre-selected challenge pressure level at a steep rate of regain, and undergoes several periods of oscillatory dampening before settling into a true track of challenge pressure. Challenge pressure overshoot is much less of a problem when respirators with moderate leak rates are being tested because make-up air via the larger leakage path is more readily available. The current FitTester 3000® control algorithm compensates for challenge pressure overshoot problems in a sub-optimum manner by limiting the leak rate measurement phase of the fit test to the last 1.5 seconds of the total 8-second test period. Thus, a method has been invented to limit challenge pressure overshoot, thereby limiting the duration of the attack phase of the CNP fit test in order to provide more time for leak rate measurement during the track phase of the test.

Pressure Step-Down Method

The CNP challenge pressure overshoot problem can be corrected by progressively stepping in-mask pressure down to the challenge pressure in a prescribed manner in order to limit challenge pressure overshoot. This solution is based on an initial assumption that a small volume respirator with a low leak rate is being tested. If in-mask pressure feedback during CNP test progression disproves the initial assumption, successively higher attack regimens are executed until challenge pressure is established. The general manner for progressively driving the preferred CNP system motor/piston assembly to challenge pressure is described as follows.

At test initiation, the motor/piston assembly should be accelerated at a high drive rate to exhaust the in-mask air volume required to establish the selected challenge pressure in a well-fitting half-mask respirator (nominal in-mask volume of 0.5 liter; nominal assumed low leak rate of 25 ml/min). The motor would exit the initial piston acceleration being driven at a constant attack flow rate (AFR) equivalent to [(by-pass orifice flow rate at selected challenge pressure)+(nominal 25 ml/min presumed mask leak rate (PLR)]. (Note: by-pass orifice flow rates over a range of challenge pressures are currently determined during daily automated by-pass orifice calibrations of the FitTester 3000®).

This initial portion of the Attack phase should take less than 1.0 sec. As the in-mask pressure trace rolls from vertical (attack or pull phase) towards horizontal (constant flow rate or track phase), a check of in-mask pressure will determine subsequent motor control logic based on the following iterative algorithm or its equivalent:

a. If in-mask pressure<25% of challenge pressure, set AFR=3×AFR and PLR=3×PLR, else;
b. If in-mask pressure<50% of challenge pressure, set AFR=2×AFR and PLR=2×PLR, else;
c. If in-mask pressure<75% of challenge pressure, set AFR=1.5×AFR and PLR=1.5×PLR; else
d. If in-mask pressure>75% of challenge pressure, enter track phase of test.

An alternative method for limiting challenge pressure overshoot involves conducting a single preliminary test of mask leakage using the current aggressive initial piston pull in order to estimate parameters for internal mask volume, material compliance, and mask leak rate. These estimates would be based on the magnitude of challenge pressure overshoot experienced during the preliminary test. The initial piston pull rate for all subsequent tests for the current subject would be modified based on the following algorithm or its equivalent:

a. If challenge pressure overshoot>3×challenge pressure, set AFR=AFR/3 and PLR=PLR/3; else b. If challenge pressure overshoot>2×challenge pressure, set AFR=AFR/2 and PLR=PLR/2; else c. If challenge pressure overshoot>1.5×challenge pressure, set AFR=AFR/1.5 and PLR=PLR/1.5; else d. If challenge pressure overshoot>1.25×challenge pressure, set AFR=AFR/1.25 and PLR=PLR/1.25; else e. Proceed with fit test using current aggressive initial piston pull.

Since each Attack phase ends with the motor/piston assembly being driven at a constant flow rate, the final approach of in-mask pressure to the challenge pressure should be from a much more horizontal aspect, thereby minimizing oscillation about the challenge pressure. When 10 consecutive measurements of in-mask pressure are within the prescribed error band around challenge pressure, an "initiation flag" is set to mark the end of the attack phase and the initiation of the Track phase of the fit test. The attack phase should be completed in less than 3 seconds with minimal challenge pressure overshoot.

Maintaining the Challenge Pressure During the Track Phase

The resolution of challenge pressure overshoot problems will enable the CNP track phase to be initiated with the motor/piston assembly already tracking challenge pressure at a steady-state flow rate. During the track phase, experience has shown that major in-mask pressure changes are usually caused by in-mask volumetric changes related to inadvertent head or facial movements, rather than by substantial changes in actual mask leak rates. In-mask pressure spikes related to inadvertent head or facial movement during the test are typically transient, with in-mask pressure quickly returning to pre-spike levels. Since actual leakage flow rate into the mask remains essentially constant with challenge pressure held constant, a less aggressive track rate (approximately 25% of initial attack rate) provides better tracking of challenge pressure and better integration through inadvertent transient pressure spikes. The switch to the less aggressive track rate should occur when the initiation flag is set. Having the motor aggressively track transient pressure spikes during the track phase introduces an oscillatory condition and aggravates the effort to track challenge pressure.

Measuring and Reporting Respirator Leak Flow Rate

During the CNP test measurement phase, the measurement of respirator leakage should be restricted to periods when in-mask pressure appropriately tracks the specified challenge pressure. The quality of a CNP determination of mask leakage is fundamentally tied to how well the challenge pressure is maintained in the mask during the measurement phase. Experience has shown that, since CNP devices detect in-mask pressure changes at sonic velocity, they are extremely sensitive to volumetric and pressure changes associated with subject head or facial movement during the measurement phase. In a temporarily sealed respirator, movement-related pressure changes would be expected to average out over the test period. However, positive pressure excursions due to unwanted subject movement could cause air to be lost by being forced out through the respirator's exhalation valve, which is held shut during inhalation by internal negative pressure.

In its current implementation, the preferred CNP device requires a subject to repeat a test if they move too much to produce a steady pressure trace during the measurement phase. For example, excessive movement during the last 1-2 seconds of a test would adversely affect or negate an otherwise successful test. The only option currently available is to repeat the test procedure after advising the test subject to remain motionless during the test, which can be a source of frustration to the test subject.

Integration of Acceptable Measurement Periods (Bins)

Thus, an improved fit-testing method involves storing pressure and leak flow rate information into an array during the track phase of the fit test and then applying a post-test analysis algorithm to integrate all acceptable CNP leak measurements while excluding from the measurement those segments of the track phase that do not meet specified pressure criteria. The method involves identifying periods or bins of acceptable pressure tracking, determining whether an acceptable number of such bins was produced during the fit test, and integrating the flow rate measurements associated with each bin to determine the mean respirator leak rate for that specific test.

An acceptable pressure bin is defined as a minimum portion of the Track phase (e.g. 0.5 second) during which contiguous in-mask pressure measurements all fall within a specified range (e.g. ±10%) of the challenge pressure. The minimum number and duration of test bins needed to determine and report CNP measurements of leakage with acceptable accuracy can be empirically derived in a straightforward manner.

Preliminary tests have shown that using the mean of all 0.5 second bins of in-mask pressure that fall within ±10% of challenge pressure during the track phase provides a good estimate of actual challenge pressure and mask leakage. Overall CNP test quality can be quantified as a function of the number of acceptable pressure bins recorded during the fit test, which can be directly and easily assessed by the control algorithm. Depending on the number of bins detected, the test result could be reported as:

a. If bins>3, then report measured leak rate; else b. If 3>bins>0, then report estimated leak rate; else c. If bins=0, then report retry test.

Implementation of the recommended CNP improvements as outlined above will enable a CNP device to be easily operated with minimal instruction by the test subject, thereby eliminating the need for a fit-test administrator. The creation of a subject operable respirator fit test device would have notable utility as a training device, and would also enable subjects to don respirators and receive immediate feedback on the amount of respirator leakage resulting from the donning technique. Instead of relying on a single annual fit test, as is the current practice, feedback based respirator donning could be employed immediately prior to each worker's entry into a potentially toxic environment.

Various changes in the details and components that have been described may be made by those skilled in the art within the principles and scope of the invention herein described in the specification and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A method for fit testing a respirator having a breathing port, comprising the steps of:

(a) placing the respirator on a test subject's face, (b) having the test subject hold his breath, (c) activating a switch that closes a breathing port of said respirator, thereby initiating a controlled negative pressure testing protocol, after monitoring of intra-respirator pressure indicates said intra-respirator pressure substantially equals ambient pressure;

(d) producing and maintaining a predetermined level of vacuum in the respirator; and (e) measuring a flow rate of air necessary to maintain said level of vacuum; wherein the test subject inhales immediately before holding his breath.

2. The method of claim 1, wherein the switch is activated by the test subject.

3. The method of claim 1, wherein said step of producing and maintaining a predetermined level of vacuum in the respirator comprises closing the breathing port by generating an air pressure sufficient to move a diaphragm within the breathing port into an air-sealing position.

4. The method of claim 1, wherein a vacuum source with a piston is utilized and said steps of producing and maintaining a predetermined level of vacuum in the respirator and measuring a flow rate of air necessary to maintain said level of vacuum comprise exhausting air from the respirator to generate and maintain a desired negative challenge pressure inside the respirator for a specified test period, whereby the challenge pressure is held constant, and measurement of a piston displacement rate yields a direct measure of an air leakage rate into the respirator.

5. The method of claim 4, wherein internal respirator pressure is progressively reduced to the negative challenge pressure in order to limit challenge pressure overshoot.

6. The method of claim 5, wherein internal respirator pressure is progressively reduced to the negative challenge pressure by adjusting a motor control logic of a vacuum source based on the following iterative algorithm:

if in-mask pressure≦25% of challenge pressure, set AFR=3×AFR and PLR=3×PLR; else if in-mask pressure≦50% of challenge pressure, set AFR=2×AFR and PLR=2×PLR; else if in-mask pressure≦75% of challenge pressure, set AFR=1.5×AFR and PLR=1.5×PLR; else if in-mask pressure≦75% of challenge pressure, enter track phase of test, wherein AFR is attack flow rate and PLR is presumed mask leak rate.

7. The method of claim 4, wherein said internal respirator pressure is progressively stepped down to the negative challenge pressure by adjusting motor control logic of a vacuum source based on the following iterative algorithm:

if challenge pressure overshoot>3×challenge pressure, set AFR=AFR/3 and PLR=PLR/3; else if challenge pressure overshoot>2 ×challenge pressure, set AFR=AFR/2 and PLR=PLR/2; else if challenge pressure overshoot >1.5×challenge pressure, set AFR=AFR/1.5 and PLR=PLR/1.5; else if challenge pressure overshoot>1.25×challenge pressure, set AFR=AFR/1.25 and PLR=PLR/1.25; else proceed with fit test using current aggressive initial piston pull, wherein AFR is attack flow rate and PLR is presumed mask leak rate.

8. The method of claim 4, wherein said measurement of a piston displacement rate further comprises:

(a) storing pressure and leak flow rate information in an array during a track phase of the fit test; and (b) applying a post-test analysis algorithm to integrate all acceptable leak measurements while excluding those segments of the track phase that do not meet predetermined pressure criteria, wherein an acceptable pressure bin is defined as a minimum portion of the track phase during which contiguous in-respirator pressure measurements all fall within a specified range of said challenge pressure.

9. The method of claim 8, wherein said specified range of said challenge pressure comprises±10%.

10. The method of claim 4, wherein said measurement of a piston displacement rate further comprises:

(a) identifying periods or bins of acceptable pressure tracking, (b) determining whether an acceptable number of such bins was produced during the fit test; and (c) integrating the flow rate measurements associated with each bin to determine the mean respirator leak rate for that specific test.

11. The method of claim 10, wherein test quality is quantified as a function of the number of acceptable pressure bins recorded during the fit test.

12. The method of claim 11, wherein said function comprises:

if bins>3, then report measured leak rate; else if 3>bins>0, then report estimated leak rate; else if bins=0, then report retry test.

13. The method of claim 1, wherein release of the switch results in the opening of the breathing port.

14. A method for fit testing a respirator having a breathing port and worn on the face of a test subject whom is holding a breath, wherein the test subject inhales immediately before said breath holding, the method comprising the steps of:

(a) initiating a controlled negative pressure testing protocol, after monitoring of an intra-respirator pressure indicates said intra-respirator pressure substantially equals ambient pressure;

(b) producing and maintaining a predetermined level of vacuum in the respirator; and (c) measuring a flow rate of air necessary to maintain said level of vacuum.

* * * * *

UNITED STATES PATENT AND TRADEMARK OFFICE

CERTIFICATE OF CORRECTION

PATENT NO. : 8,011,368 B2
APPLICATION NO. : 10/599953
DATED : September 6, 2011
INVENTOR(S) : Clifton D. Crutchfield It is certified that error appears in the above-identified patent and that said Letters Patent is hereby corrected as shown below:

On the Title page,

(74) Attorney, Agent, or Firm, “Gavin J. Milczarek-Dessi” should read -- Gavin J. Milczarek-Desai --

Column 15, line 38 (Claim 6, line 11) “pressure≤75%” should read -- pressure >75% --

Signed and Sealed this
Eighth Day of November, 2011

David J. Kappos
*Director of the United States Patent and Trademark Office*